US007628192B2

(12) United States Patent
Teufel et al.

(10) Patent No.: US 7,628,192 B2
(45) Date of Patent: Dec. 8, 2009

(54) METHODS OF DEBONDING A COMPOSITE TOOLING

(75) Inventors: Paul Teufel, Los Alamitos, CA (US); Curtis Longo, Alta Loma, CA (US)

(73) Assignee: Toyota Motor Sales U.S.A., Inc., Torrance, CA (US)

( * ) Notice: Subject to any disclaimer, the term of this patent is extended or adjusted under 35 U.S.C. 154(b) by 675 days.

(21) Appl. No.: 11/490,105

(22) Filed: Jul. 21, 2006

(65) Prior Publication Data

US 2007/0006960 A1 Jan. 11, 2007

Related U.S. Application Data

(62) Division of application No. 10/622,737, filed on Jul. 21, 2003, now Pat. No. 7,101,452.

(60) Provisional application No. 60/396,748, filed on Jul. 19, 2002.

(51) Int. Cl.
*B32B 37/00* (2006.01)
(52) U.S. Cl. .................. 156/510; 156/425; 156/513; 156/529
(58) Field of Classification Search .............. 156/500, 156/289, 285, 510, 513, 529, 533, 425
See application file for complete search history.

(56) References Cited

U.S. PATENT DOCUMENTS

| | | | |
|---|---|---|---|
| 2,517,902 A | 8/1950 | Luebkeman | |
| 4,101,254 A | 7/1978 | Wiltshire | |
| 4,118,162 A * | 10/1978 | Baumgarten | 425/113 |
| 4,783,232 A | 11/1988 | Carbone et al. | |
| 4,822,444 A | 4/1989 | Weingart et al. | |
| 4,869,761 A | 9/1989 | Weingart et al. | |
| 4,907,754 A | 3/1990 | Vaniglia | |
| 4,938,824 A | 7/1990 | Youngkeit | |
| 5,022,952 A | 6/1991 | Vaniglia | |
| 5,059,377 A | 10/1991 | Ashton et al. | |
| 5,223,067 A | 6/1993 | Hamamoto et al. | |
| 5,242,523 A | 9/1993 | Willden et al. | |
| 5,259,901 A | 11/1993 | Davis et al. | |
| 5,262,121 A | 11/1993 | Goodno | |
| 5,266,137 A | 11/1993 | Hollingsworth | |

(Continued)

FOREIGN PATENT DOCUMENTS

EP 0 770 472 A1 5/1997

(Continued)

OTHER PUBLICATIONS

John Berry, International Search Report for International Application No. PCT/US01/43091 (Jul. 17, 2002).

(Continued)

*Primary Examiner*—Jeff H Aftergut
(74) *Attorney, Agent, or Firm*—Finnegan, Henderson, Farabow, Garrett & Dunner LLP (57) ABSTRACT

The present invention relates to methods of debonding a tooling for a fuselage. In particular, the present invention relates to methods of debonding a tooling for a fuselage using a debonding agent. In one implementation, isopropyl alcohol is applied to a tooling to break the cohesive bond between the tooling and the fuselage.

28 Claims, 12 Drawing Sheets

U.S. PATENT DOCUMENTS

| | | | |
|---|---|---|---|
| 5,362,345 | A | 11/1994 | Stettler et al. |
| 5,378,109 | A | 1/1995 | Lallo et al. |
| 5,447,765 | A | 9/1995 | Crane |
| 5,571,357 | A | 11/1996 | Darrieux et al. |
| 5,925,297 | A | 7/1999 | Noto |
| 6,086,524 | A | 7/2000 | Martin |
| 6,096,164 | A | 8/2000 | Benson et al. |
| 6,179,945 | B1 | 1/2001 | Greenwood et al. |
| 6,190,598 | B1 | 2/2001 | Murphy et al. |
| 6,610,229 | B1 | 8/2003 | Morales et al. |
| 6,823,578 | B2 | 11/2004 | Anderson et al. |
| 7,124,797 | B2 | 10/2006 | Anderson et al. |
| 2002/0069962 | A1 | 6/2002 | Maxwell et al. |

FOREIGN PATENT DOCUMENTS

| | | |
|---|---|---|
| EP | 0 786 330 A2 | 7/1997 |
| EP | 1 005 978 A2 | 6/2000 |
| FR | 2 424 470 | 11/1979 |
| FR | 2 664 529 | 1/1992 |
| GB | 1 481 167 | 7/1977 |
| GB | 2 232 954 A | 1/1991 |
| JP | 0 4179515 | 6/1992 |
| WO | WO 98/32589 | 7/1998 |

OTHER PUBLICATIONS

J. Carre, International Search Report for International Application No. PCT/US02/05094 (Aug. 2, 2002).

D.V. Rosato et al., "Filament Winding: Its Development, Manufacture, Applications, and Design," John Wiley & Sons, Inc., (1964).

A. Van Wallene, International Search Report for International Application No. PCT/US01/45750 (Sep. 19, 2002).

McMaster-Carr Supply Company Catalog 105, p. 1581 (1999).

* cited by examiner

METHODS OF DEBONDING A COMPOSITE TOOLING

I. CROSS-REFERENCE TO RELATED APPLICATION

This is a divisional application of application Ser. No. 10/622,737, filed Jul. 21, 2003, by Curtis Longo and Paul Teufel and titled METHODS OF DEBONDING A COMPOSITE TOOLING, now allowed, and now U.S. Pat. No. 7,101,452, which claims the benefit of U.S. Provisional Application No. 60/396,478, filed Jul. 19, 2002, by Curtis Longo and Paul Teufel and titled METHODS OF DEBONDING COMPOSITE TOOLING, for which benefit of priority is claimed herein, and both of which are expressly incorporated herein by reference.

II. BACKGROUND

A. Technical Field

The present invention relates to methods of debonding a composite tooling. In particular, the present invention relates to methods of debonding a tooling for a fuselage.

B. Description of Related Art

Presently, composite materials (such as fiber reinforced plastics) are increasingly being used to manufacture aircraft. The manufacture of such aircraft includes the manufacture of the fuselage (the central body of the aircraft), the internal frames of the fuselage, and the various other components of the aircraft. Often the manufacture of the internal frames of an aircraft fuselage with composites includes the use of trapped tooling to form the shape of the internal frames. For example, in some manufacturing processes, laminate fibers are wrapped around tooling to form the shape of the internal frames.

Following formation of the fuselage, this tooling may need to be removed. Typically, the laminate part will have bonded to the tooling, making removal of the tooling difficult. Currently, soapy water is used to aid in the removal of the tooling. However, the soapy water does not affect the bond between the laminate and the tooling. Further, the soapy water leaves a residue on the laminate.

A method of debonding a tooling for a fuselage that leaves little residue and releases the bond between the tooling and the fuselage would therefore provide many advantages. Therefore, it is desirable to provide a method of debonding a tooling from a fuselage that leaves little residue.

III. SUMMARY OF THE INVENTION

Apparatus and methods consistent with the invention may provide for a method of removing a mandrel from a part. The method includes creating a vacuum in the mandrel, applying a debonding agent on the surface of the mandrel, and removing the mandrel from the part.

Additional aspects of the invention are disclosed and defined by the appended claims. It is to be understood that both the foregoing general description and the following detailed description are exemplary and explanatory only and are not restrictive of the invention as claimed.

IV. BRIEF DESCRIPTION OF THE DRAWINGS

The accompanying drawings, which are incorporated in and constitute a part of this specification, illustrate several embodiments consistent with the invention and, together with the following description, serve to explain the principles of the invention.

In the drawings.

V. DESCRIPTION OF THE EMBODIMENTS

A. Introduction

FIGS. 1-7 illustrate a process for creating a fuselage using tooling. This process is only exemplary and is described for the purpose of providing background for the present invention. Other processes for creating a fuselage using tooling may also be used. FIGS. 8-12 describe methods of debonding tooling for a fuselage consistent with the present invention.

Figure 1:
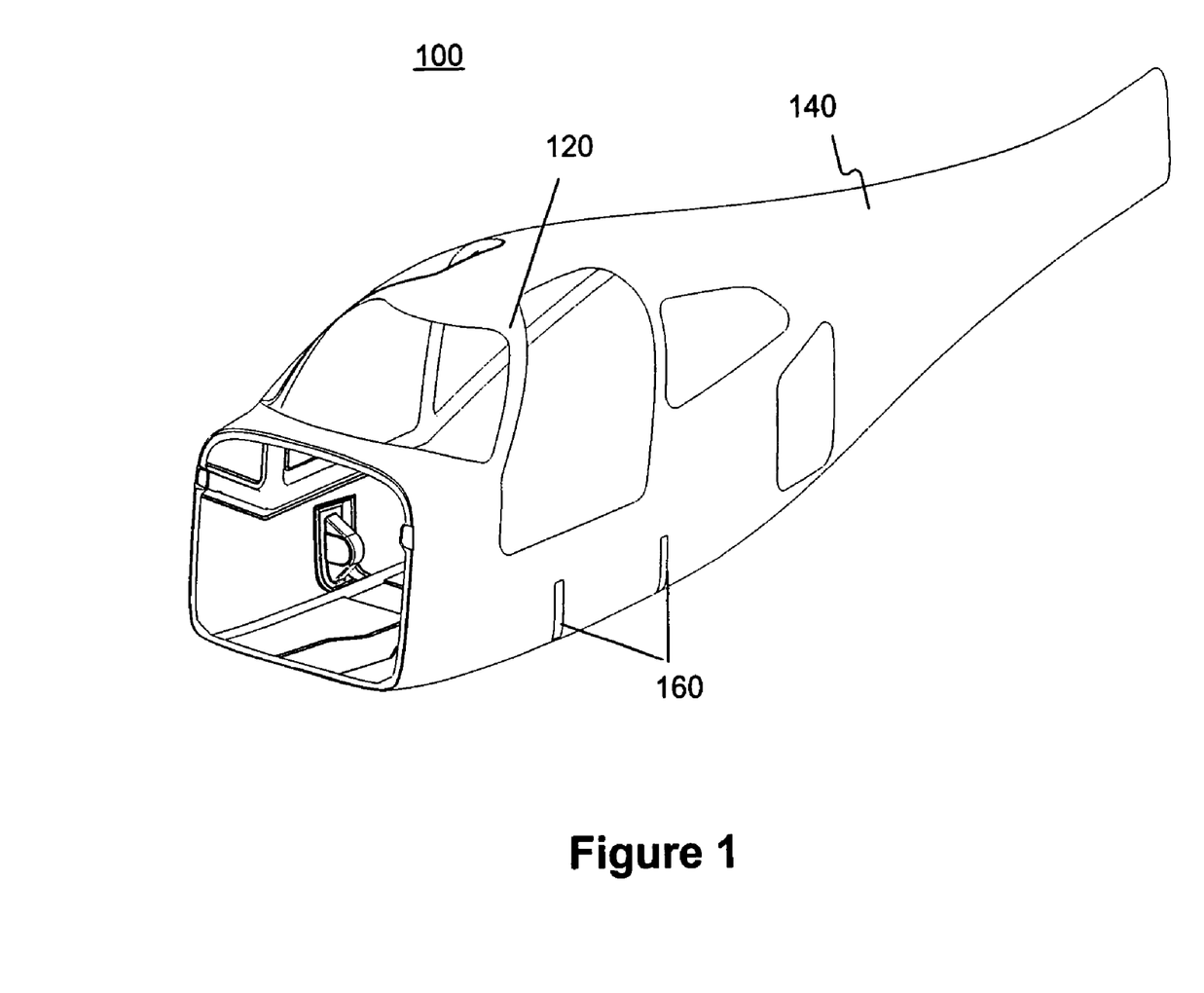
FIG. 1 is a perspective view of a fuselage for an aircraft.

FIG. 1 is a perspective view of a fuselage for an aircraft. As shown in FIG. 1, a fuselage 100 comprises an exterior skin 140, frame sections 120, and attachment pockets 160 for wings. Fuselage 100 may also comprise other frame sections, attachments pockets, and flanges (not shown). Fuselage 100 may also comprise other components and subcomponents (not shown).

Figure 2:
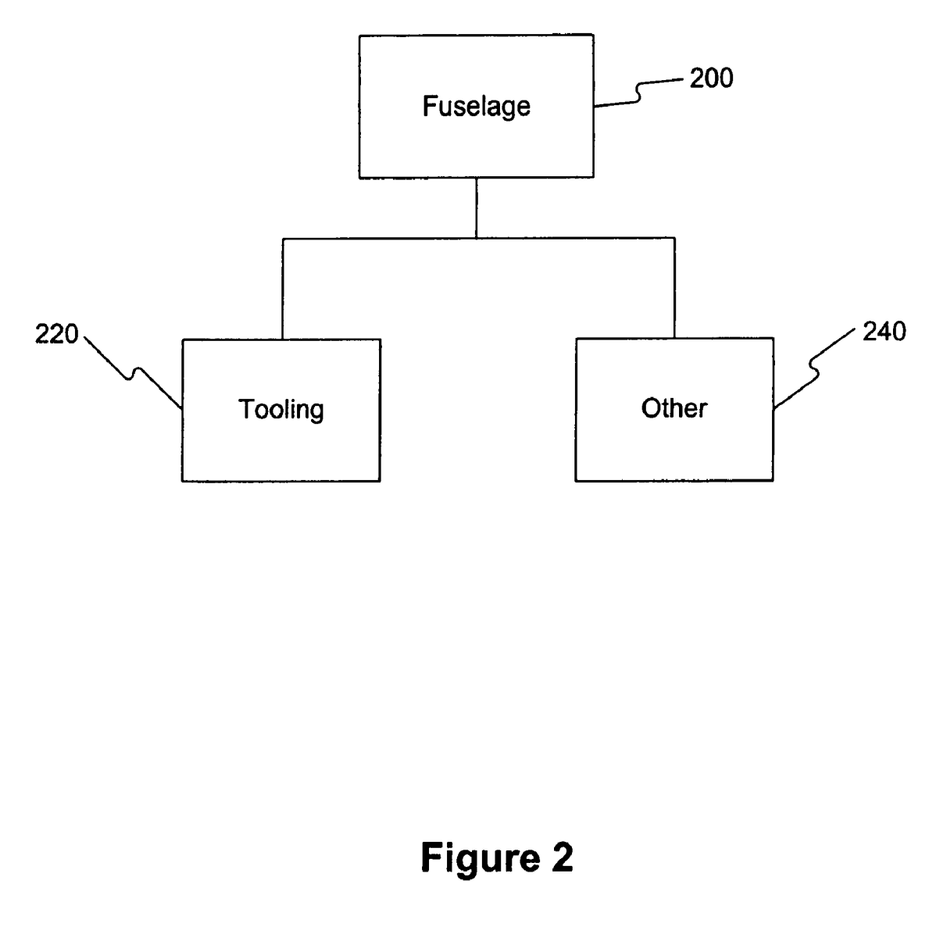
FIG. 2 is a block diagram illustrating apparatus for manufacturing a fuselage.

FIG. 2 is a block diagram illustrating apparatus for manufacturing a fuselage. As shown in FIG. 2, the apparatus for manufacturing a fuselage 200 include tooling 220 and other 240. Tooling 220 includes any tooling apparatus for manufacturing a fuselage. For example, tooling 220 may include metal molds, molds made from composite materials, and/or mandrels made from metals and composite materials. Tooling 220 also includes toolings made from elastomeric materials such as silicone, urethane, or natural rubbers. Tooling 220 further includes plastic or metal dies and punches. Other 240 may include molding apparatus, integrated tooling and molding apparatus, and filament winding apparatus, as well as any other apparatus.

In one implementation, tooling 220 includes an elastomeric tooling for an internal frame mandrel. In this implementation, the elastomeric tooling is a mandrel filled with media, which is used to maintain the internal shape of a frame during construction of the fuselage. This implementation is merely exemplary, and other implementations may also be used.

Figure 3:
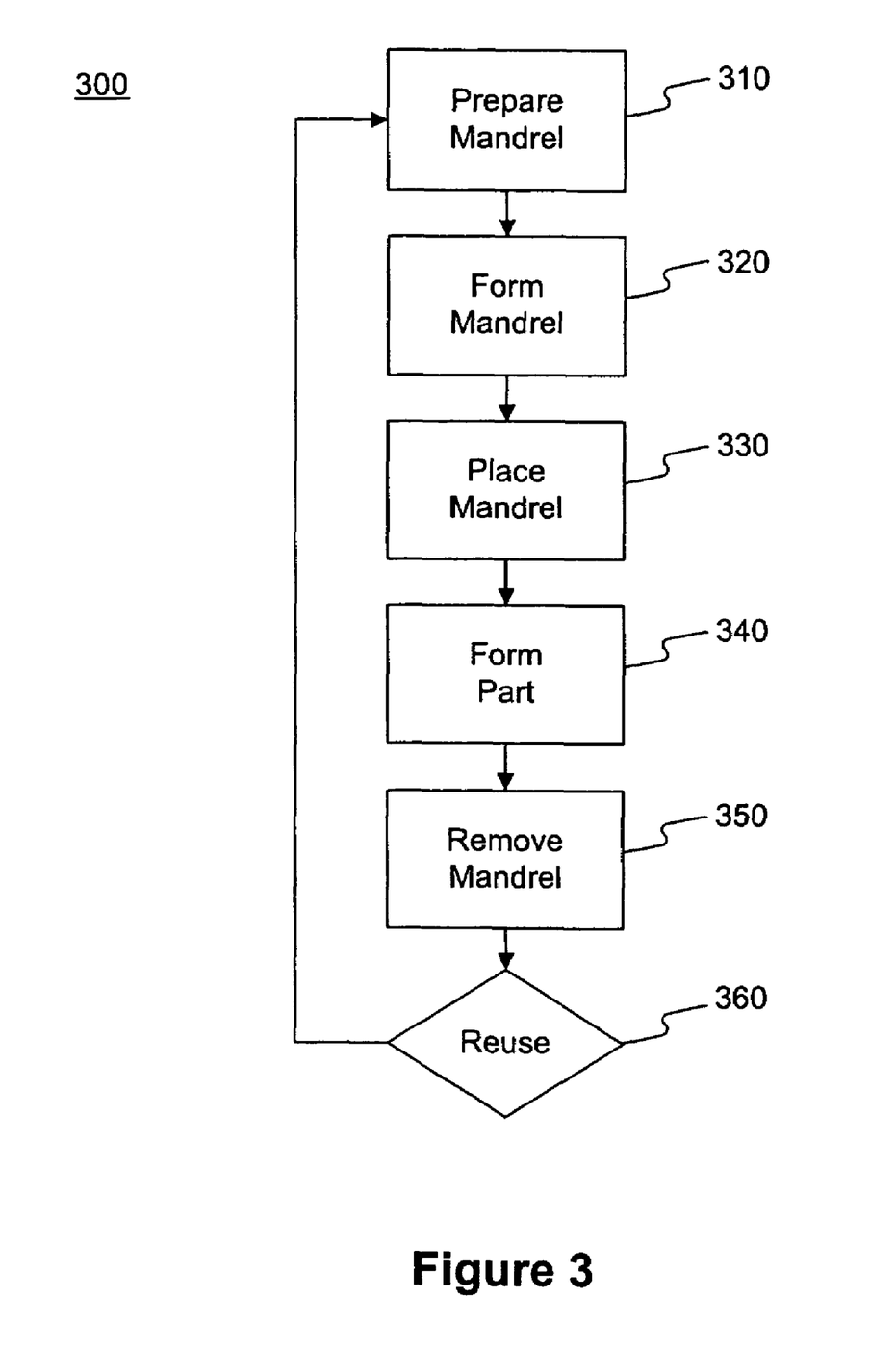
FIG. 3 is a flow diagram illustrating a process for creating an internal frame of a fuselage using a mandrel, as shown in FIG. 2.

FIG. 3 is a flow diagram illustrating a process for creating an internal frame of a fuselage using a mandrel, as shown in FIG. 2. As shown in FIG. 3, in one implementation, process 300 for creating an internal frame of a fuselage using a mandrel comprises prepare mandrel 310, form mandrel 320, place mandrel 330, form part 340, remove mandrel 350, and reuse 360. As described above, this process is only exemplary and is described for the purpose of providing background for the present invention. Other processes for creating a fuselage using tooling may also be used consistent with the invention.

In this implementation, process 300 begins with prepare mandrel 310. In this implementation, prepare mandrel 310 comprises the selection of the size, shape, and type of mandrel to form the internal frame of the fuselage. Prepare mandrel 310 is further described in FIG. 4.

In this implementation, prepare mandrel 310 is followed by form mandrel 320. Form mandrel 320 comprises the forming of the mandrel to the desired shape of the internal frame. Form mandrel 320 may also comprise filling the mandrel with media. Form mandrel 320 is further described in FIG. 5.

In this implementation, form mandrel 320 is followed by place mandrel 330. Place mandrel 330 comprises the placement of the frame mandrel onto a tooling for formation of the internal frame of the fuselage. Place mandrel 330 is further described in FIG. 6.

In this implementation, place mandrel 330 is followed by form part 340. Form part 340 comprises the formation of the fuselage by any process using a frame mandrel. This may comprise the winding of filament around the mandrel. Form part 340 is further illustrated in FIGS. 7A-7B.

In this implementation, form part 340 is followed by remove mandrel 350. Remove mandrel 350 comprises the removal of the mandrel from the fuselage consistent with one embodiment of the present invention. Remove mandrel 350 may also comprise the extraction of media from the mandrel. Remove mandrel 350 is further described in FIGS. 8-12.

In this implementation, remove mandrel 350 is followed by reuse 360. As shown in FIG. 3, after remove mandrel 350, reuse 360 indicates that the mandrel may be reused again.

The stages in FIG. 3 are merely exemplary, and other stages and other implementations may also be used.

Figure 4:
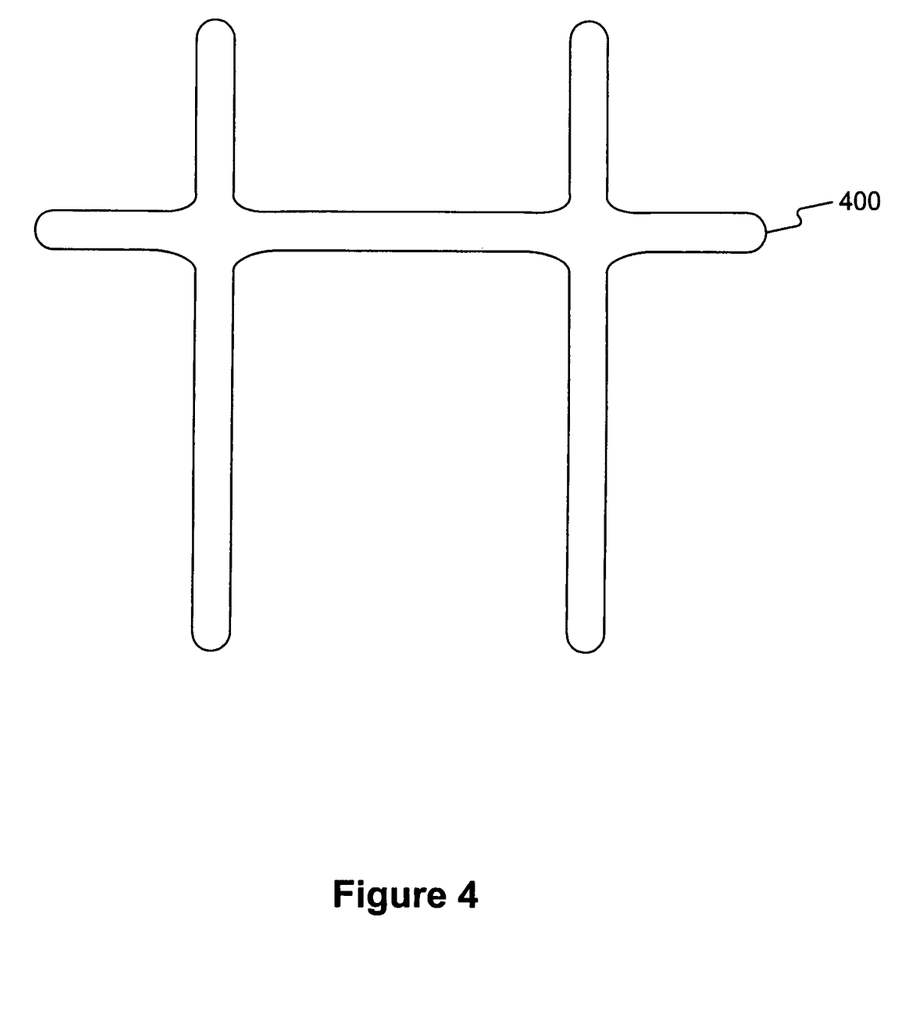
FIG. 4 illustrates a mandrel for an internal frame, as described in FIG. 3.

FIG. 4 illustrates a mandrel for an internal frame, as described in FIG. 3. FIG. 4 shows an internal frame mandrel 400, such as, for example, a reusable elastomeric mandrel currently available through International Design Technologies, Inc (IDT). This implementation is merely exemplary, and other implementations may also be used.

Mandrel 400 may comprise premolded silicone or any other appropriate form or substance. Some silicone materials that have been found acceptable include those available from Mosite, Kirkhill, and D Aircraft Products. In addition, there are many other suppliers of high temperature (up to 400° F.), unfilled, and uncured silicone sheet materials that may be used, depending upon the cure temperature of the desired part. In one implementation, a material, such as Depco 63 available from D Aircraft Products, can be sprayed to make an elastomeric mandrel. These implementations are merely exemplary, and other implementations may also be used.

Figure 5:
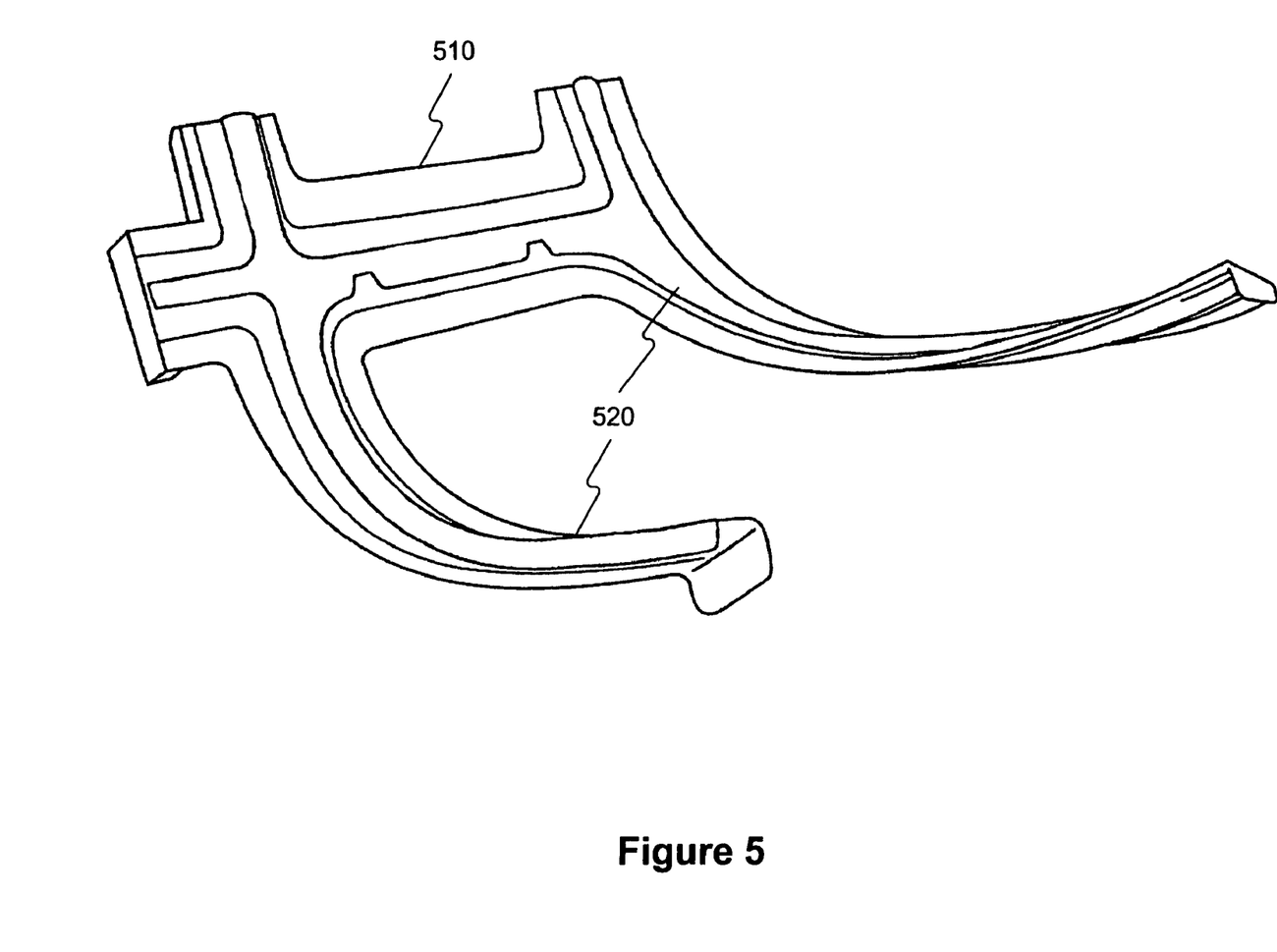
FIG. 5 illustrates formation of a mandrel, as shown in FIG. 4.

FIG. 5 illustrates formation of a mandrel, as shown in FIG. 4. As shown in FIG. 5, mandrel 520 is placed in a form tool 510 to form the desired shape of the internal frame mandrel. In one implementation, mandrel 520 is filled with air to force mandrel 520 to conform to the shape of form tool 510. This implementation is merely exemplary, and other implementations may also be used.

In another implementation, media (not shown), such as ceramic spheres, may be placed inside mandrel 520 to form the desired shape of mandrel 520. In one implementation, mandrel 520 is vibrated to allow for more complete filling of the mandrel with media. These implementations are merely exemplary, and other implementations may also be used.

Figure 6:
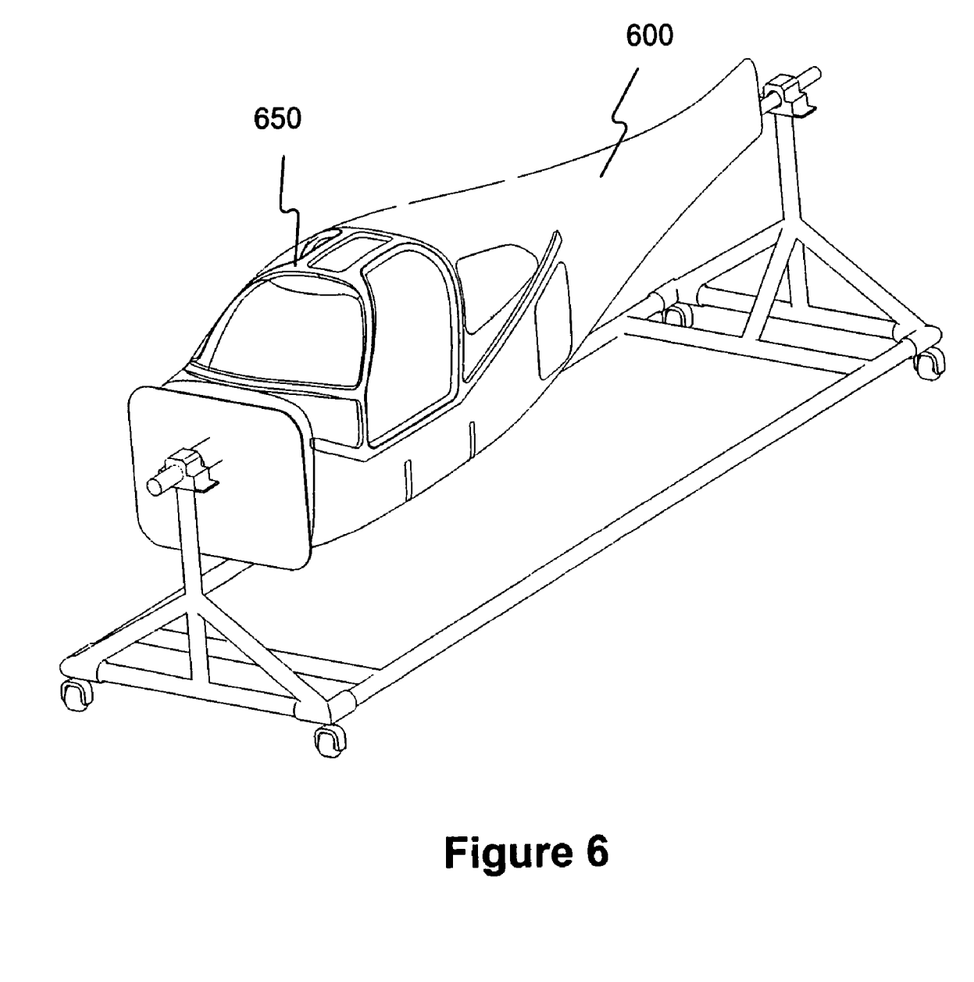
FIG. 6 illustrates frame mandrel placement on a fuselage tooling, as shown in FIG. 5.

FIG. 6 illustrates frame mandrel placement on a fuselage tooling, as shown in FIG. 5. As shown in FIG. 6, frame mandrel 650 is placed around fuselage tooling 600. Frame mandrel 650 forms the internal frame structure of the fuselage to be formed around fuselage tooling 600. In one implementation, fuselage tooling 600 may have recesses in which frame mandrel 650 is placed. This implementation is merely exemplary, and other implementations may also be used.

Figure 7A:
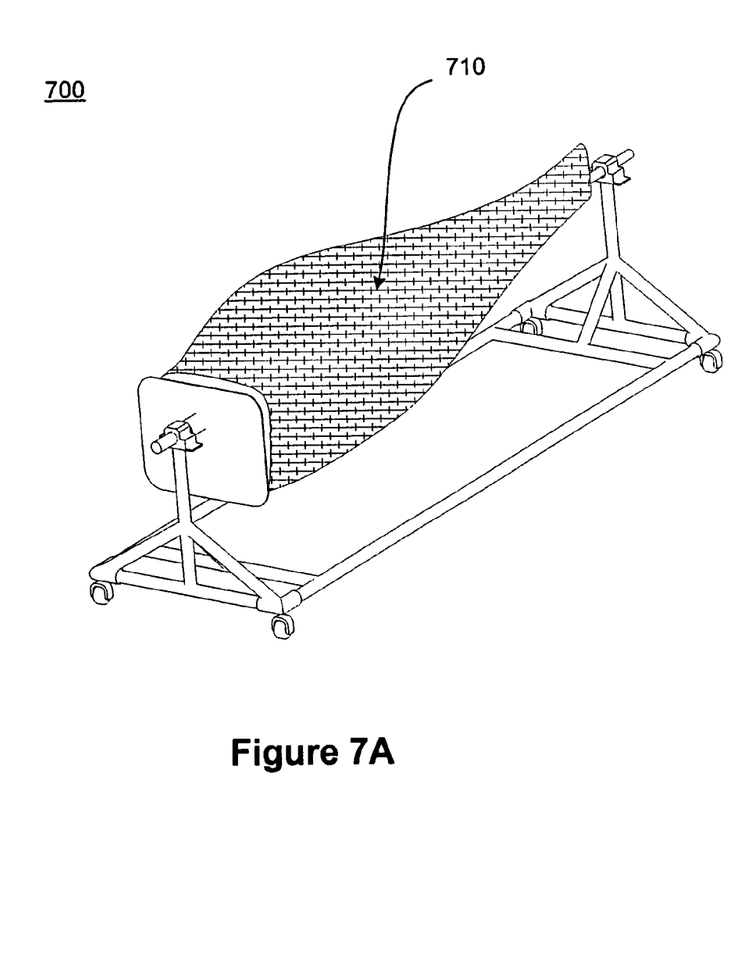
FIG. 7A is a perspective view of a fuselage formed on tooling, as shown in FIG. 6.

FIG. 7A is a perspective view of a fuselage formed on tooling, as shown in FIG. 6. As shown in FIG. 7A, fuselage 700 has been constructed around fuselage tooling 600 and frame mandrel 650 (not shown here, but described in FIG. 6). In one implementation, fuselage 700 comprises an outer skin 710. Other methods may be used to form outer skin 710. In one implementation, composite filament is wound around fuselage tooling 600 to form outer skin 710. This implementation is merely exemplary, and other implementations may also be used.

Figure 7B:
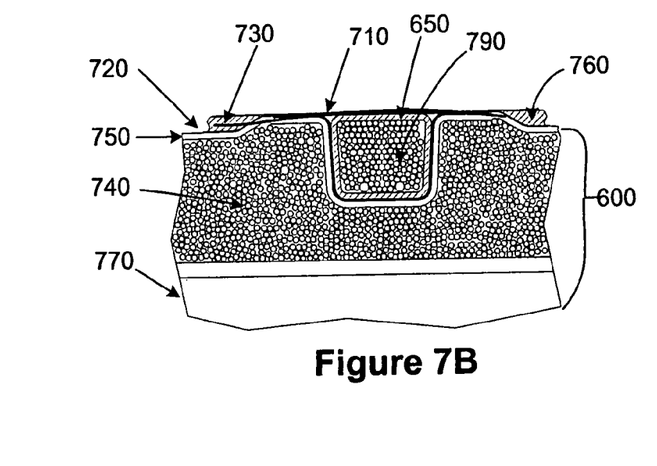
FIG. 7B is a cut-away view of fuselage formed on tooling, as shown in FIG. 7A.

FIG. 7B is a cut-away view of fuselage formed on tooling, as shown in FIG. 7A. As shown in FIG. 7B, outer skin 710 has been placed around frame mandrel 650 and fuselage tooling 600.

In this implementation, fuselage tooling 600 comprises an armature 770 and a bag 750 placed around armature 770. Bag 750 has been filled with media 740 to hold bag 750 to a desired shape. The shape of bag 750 forms the overall shape of the part to be constructed (i.e., a fuselage).

In this implementation, an inner skin 720 has been placed directly on bag 750. Inner skin 720 may be constructed of any appropriate filament material. Frame mandrel 650 has been placed on top of inner skin 720. As shown in FIG. 7B, in this implementation, frame mandrel 650 has been filled with media 790, as described in FIG. 5.

In this implementation, core 730 and filler block 760 have been placed on top of inner skin 720. Core 730 provides stiffness for the fuselage. Filler block 760 is used to assist in winding outer skin 710.

Outer skin 710 is cured around core 730, filler block 760, and frame mandrel 650 to form the fuselage. During this process, frame mandrel 650 may become bonded to inner skin 720 and/or outer skin 710. Therefore, in order to remove frame mandrel 650, it would be desirable to release these bonds. FIGS. 8-12 will describe a method of debonding frame mandrel 650 from inner skin 720 and/or outer skin 710.

B. Methods of the Invention

Figure 8:
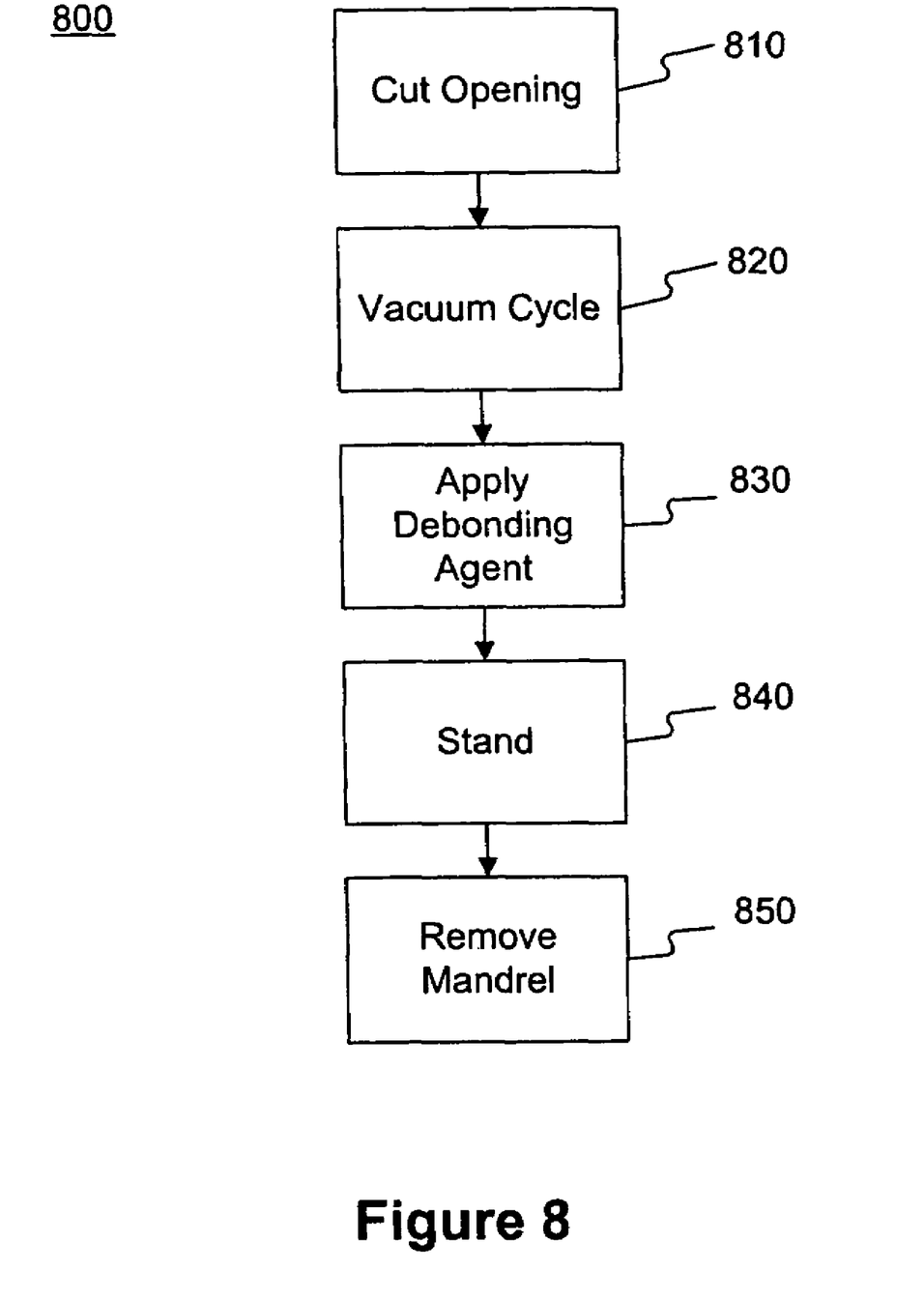
FIG. 8 is a flow diagram illustrating a process for removing an internal frame mandrel of the fuselage consistent with one embodiment of the present invention, as shown in FIG. 7.

FIG. 8 is a flow diagram illustrating a process for removing an internal frame mandrel of the fuselage consistent with one embodiment of the present invention, as shown in FIG. 7. As shown in FIG. 8, in one implementation, process 800 for removing an internal frame mandrel of a fuselage comprises cut opening 810, vacuum cycle 820, apply debonding agent 830, stand 840, and remove mandrel 850.

In this implementation, process 800 begins with cut opening 810. In this implementation, cut opening 810 comprises the cutting of an opening in the extraction end of the fuselage to allow for removal of the mandrel. Cut opening 810 may also include the removal of media from the mandrel following the cutting of the opening. Cut opening 810 is further described in FIG. 9. In another implementation, the fuselage may be designed to include an opening for removal of the mandrel. In this implementation, cut opening 810 would not be performed. These implementations are merely exemplary, and other implementations may also be used.

In this implementation, cut opening 810 is followed by vacuum cycle 820. Vacuum cycle 820 comprises cycling application of a vacuum on the mandrel to break the cohesive bond between the mandrel and the fuselage. Vacuum cycle 820 is further described in FIG. 10.

In this implementation, vacuum cycle 820 is followed by apply debonding agent 830. Apply debonding agent 830 comprises the application of a debonding agent on the mandrel. Apply debonding agent 830 is further described in FIG. 11. In one implementation, apply debonding agent 830 is performed simultaneously with vacuum cycle 820. This implementation may provide for better distribution of the debonding agent onto the mandrel.

In this implementation, apply debonding agent 830 is followed by stand 840. Stand 840 comprises allowing the debonding agent to stand on the mandrel and remove the cohesive bond between the mandrel and the fuselage. Stand 840 is further illustrated in FIG. 11.

In this implementation, stand 840 is followed by remove mandrel 850. Remove mandrel 850 comprises the removal of the mandrel from the fuselage. Remove mandrel 850 is further described in FIG. 12.

The stages in FIG. 8 are merely exemplary, and other stages and other implementations may also be used.

Figure 9:
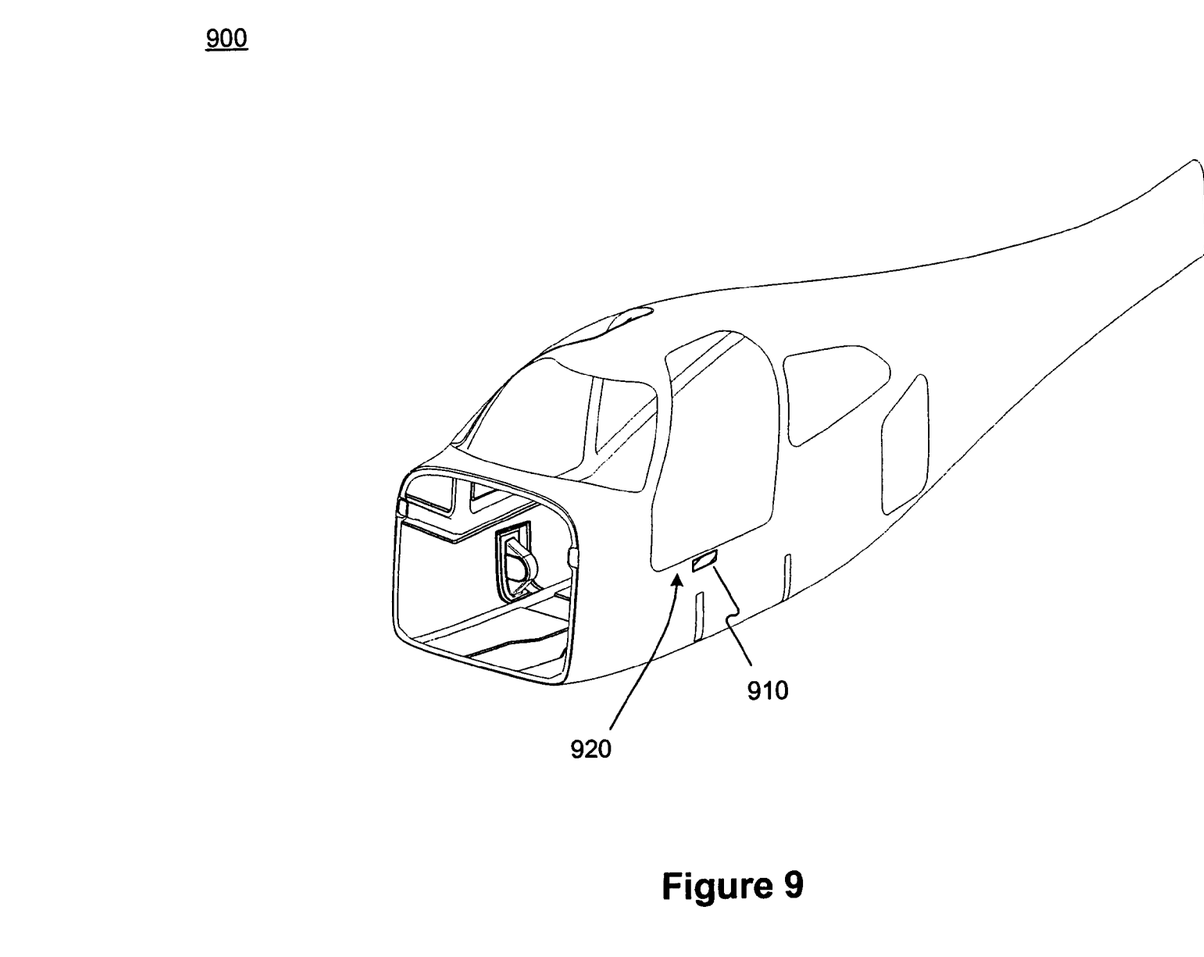
FIG. 9 illustrates cutting an opening in a fuselage consistent with one embodiment of the present invention, as shown in FIG. 8.

FIG. 9 illustrates cutting an opening in a fuselage consistent with one embodiment of the present invention, as shown in FIG. 8. As shown in FIG. 9, following creation of the fuselage, as described in FIGS. 7A-7B, fuselage 900 comprises internal frame 920, which was formed around internal frame mandrel 910. internal frame 920 has been cut to reveal a portion of internal frame mandrel 910. In one implementation, the location of the cut is chosen to allow for the straightest path to remove internal frame mandrel 910. At this point, if frame mandrel 910 contains media, this media may be removed. These implementations are merely exemplary, and other implementations may also be used.

Figure 10:
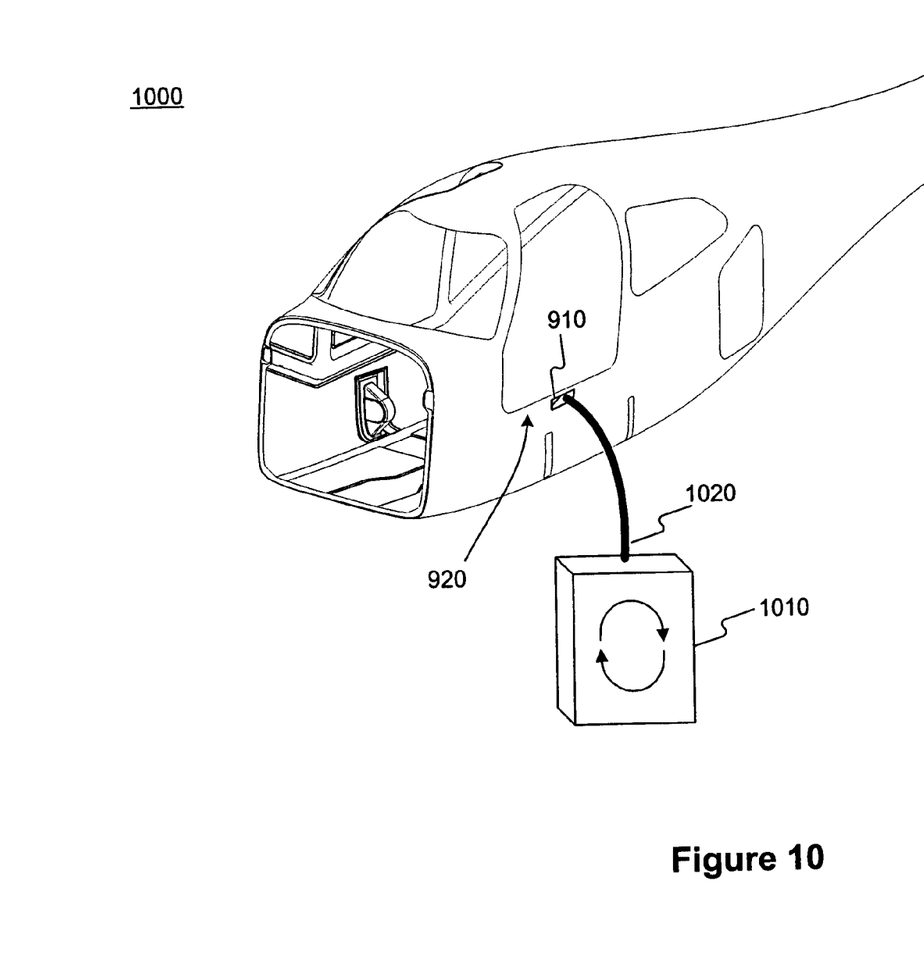
FIG. 10 illustrates applying a vacuum cycle on a frame mandrel consistent with one embodiment of the present invention, as shown in FIG. 9.

FIG. 10 illustrates applying a vacuum cycle on a frame mandrel consistent with one embodiment of the present invention, as shown in FIG. 9. As shown in FIG. 10, fuselage 1000 comprises internal frame 920, which has been cut-away to reveal a portion of frame mandrel 910.

As shown in FIG. 10, a vacuum source 1010 is connected to vacuum hose 1020, which is inserted into frame mandrel 910. A vacuum is created in mandrel 910 by vacuum source 1010. In one implementation, a vacuum is alternately created in mandrel 910 and then released several times. In another implementation, the vacuum is held for 5-10 seconds and is alternately created and released 2-3 times. The application of a vacuum cycle to mandrel 910 will cause mandrel 910 to contract. This contraction will break some of the cohesive bonds between mandrel 910 and internal frame 920. These implementations are merely exemplary, and other implementations may also be used.

Figure 11:
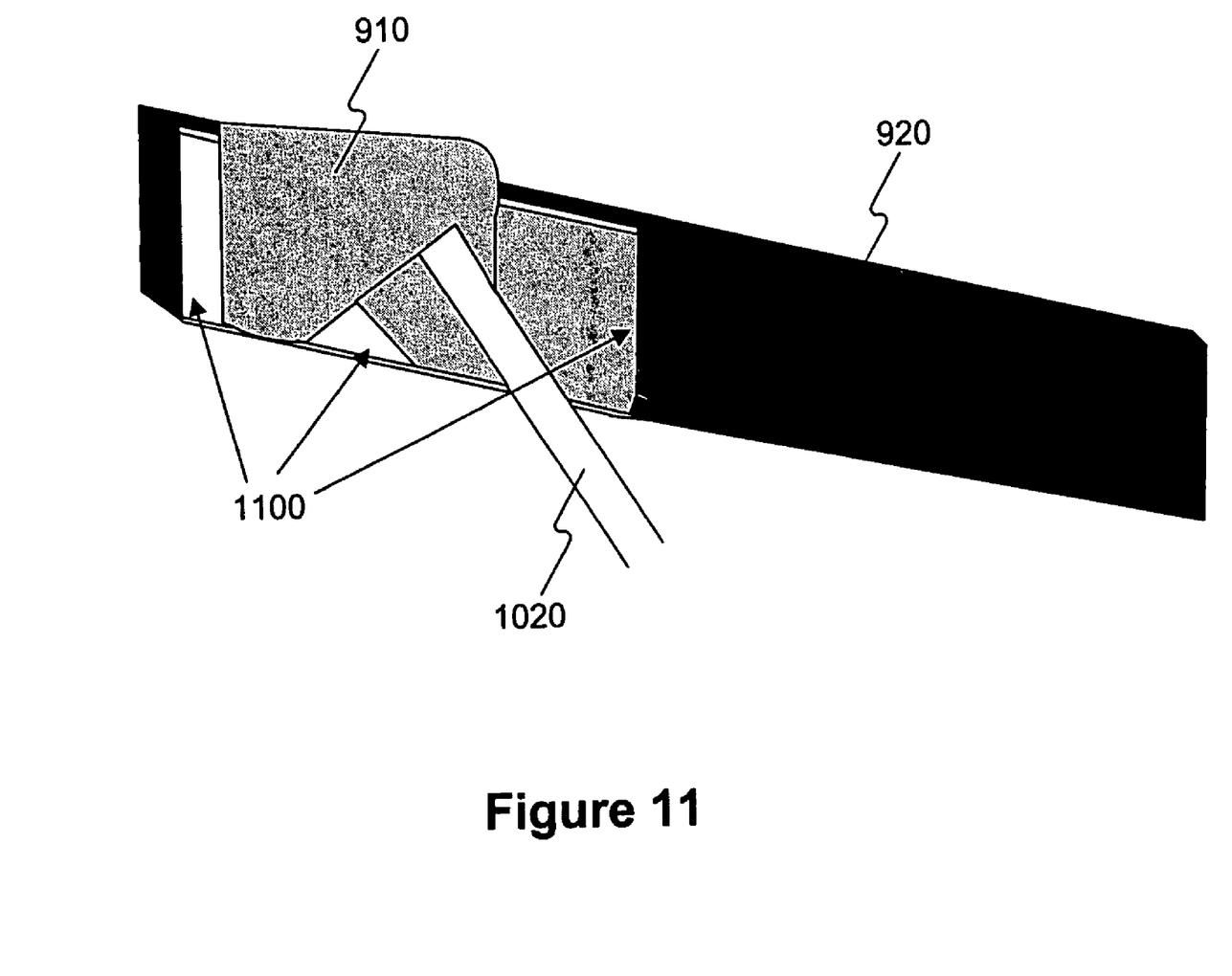
FIG. 11 illustrates applying a debonding agent on a frame mandrel consistent with one embodiment of the present invention, as shown in FIG. 10.

FIG. 11 illustrates applying a debonding agent on a frame mandrel consistent with one embodiment of the present invention, as shown in FIG. 10. As shown in FIG. 11, a chemical debonding agent 1100, such as isopropyl alcohol, is applied in areas between frame mandrel 910 and internal frame 920. In one implementation, debonding agent 1100 is applied as far into the openings between frame mandrel 910 and internal frame 920 as possible.

The amount of debonding agent 1100 to apply may vary based on the size of frame mandrel 910. In this implementation, debonding agent 1100 may be applied using a long tipped squirt bottle or wand tip. Vacuum hose 1020 is also visible in this figure. In another implementation, debonding agent 1100 is applied during the application of the vacuum cycle described in FIG. 10. These implementations are merely exemplary, and other implementations may also be used.

After application of debonding agent 1100, it is allowed to stand for a specified period of time. During the stand time, debonding agent 1100 will wet the surface of the mandrel by capillary action and attack the cohesive bond between mandrel 910 and internal frame 920. In one implementation, debonding agent 1100 dissolves the epoxy film between mandrel 910 and internal frame 920. This will allow mandrel 910 to be more easily removed from internal frame 920. This implementation is merely exemplary, and other implementations may also be used.

In one implementation, isopropyl alcohol is used as debonding agent 1100. In this implementation, approximately 2-3 oz. is applied and allowed to stand for approximately three to five minutes. The amount of isopropyl alcohol to apply and the stand time may vary based on the size of mandrel 910. In addition to removing the bond between mandrel 910 and internal frame 920, alcohol also will not adversely affect the fuselage and it evaporates quickly so that little residue will be left. This implementation is merely exemplary, and other materials and stand time may be used.

Figure 12:
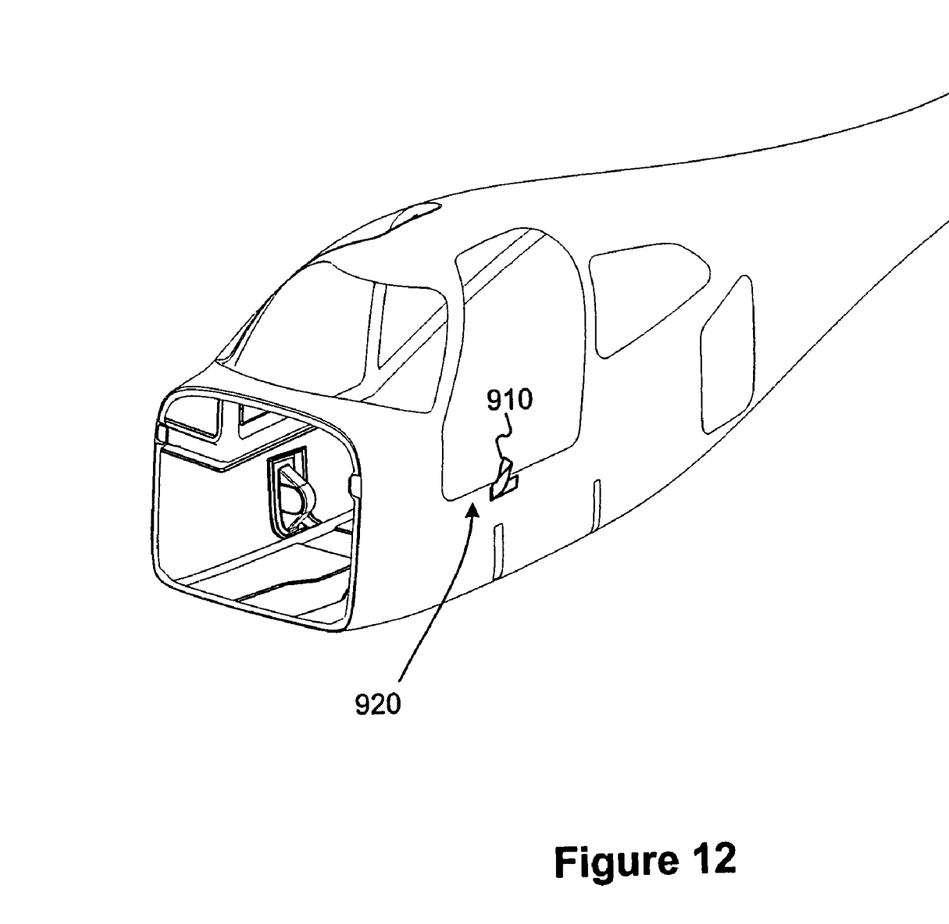
FIG. 12 illustrates removing a frame mandrel consistent with one embodiment of the invention, as shown in FIG. 11.

FIG. 12 illustrates removing a frame mandrel consistent with one embodiment of the invention, as shown in FIG. 11. As shown in FIG. 12, following application of the debonding agent, mandrel 910 is removed from frame 920. Mandrel 910 may be removed either manually or by using an apparatus. In one implementation, mandrel 910 is removed by hand using a pulling motion. Following removal of mandrel 910, mandrel 910 may be cleaned and reused in the formation of another fuselage. In one implementation, the opening in frame 920 may be repaired using a pre-cured repair patch. These implementations are merely exemplary, and other implementations may also be used.

VI. CONCLUSION

As described above, therefore, other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents. In this context, equivalents mean each and every implementation for carrying out the functions recited in the claims, even if not explicitly described therein.

What is claimed is:

1. A system for removing a mandrel from a part, comprising:
   a vacuum component configured to create a vacuum in the mandrel;
   an applying component configured to apply a chemical debonding agent on the surface of the mandrel; and
   a removing component configured to remove the mandrel from the part.

2. The system of claim 1, further comprising a cutting component configured to cut an access passage in the part before creating a vacuum in the mandrel.

3. The system of claim 2, wherein the cutting component is configured to cut an access passage allowing for the straightest path to remove the mandrel from the part.

4. The system of claim 1, further comprising a second removing component configured to remove media from the mandrel.

5. The system of claim 1, further comprising a releasing component configured to release the vacuum in the mandrel prior to applying the debonding agent.

6. The system of claim 1, wherein the vacuum component is configured to alternately create a vacuum in the mandrel and release the vacuum in the mandrel.

7. The system of claim 6, wherein the vacuum component is configured to alternately create and release the vacuum two times.

8. The system of claim 6, wherein the vacuum component is configured to alternately create and release the vacuum at least three times.

9. The system of claim 6, wherein the vacuum component is configured to create the vacuum for five to ten seconds.

10. The system of claim 1, wherein the applying component is configured to apply isopropyl alcohol on the surface of the mandrel.

11. The system of claim 1, further comprising a standing component configured to allow the debonding agent to stand on the mandrel for a designated period of time.

12. The system of claim 11, wherein the designated period of time is three to five minutes.

13. The system of claim 1, wherein the mandrel is a frame mandrel.

14. The system of claim 1, wherein the part is a fuselage.

15. A system for removing a mandrel from a part, comprising:
    vacuum means for creating a vacuum in the mandrel;
    applying means for applying a chemical debonding agent on the surface of the mandrel; and
    removing means for removing the mandrel from the part.

16. A system for removing a mandrel from a part, comprising:
    a cutting component configured to cut an access passage in the part;
    a vacuum component configured to alternately create a vacuum in the mandrel and release the vacuum in the mandrel;
    an applying component configured to apply a debonding agent on the surface of the mandrel;
    a standing component configured to allow the debonding agent to stand on the mandrel for a designated period of time; and
    a removing component configured to remove the mandrel from the part.

17. The system of claim 16, wherein the component is configured to cut an access passage to allow for the straightest path to remove the mandrel from the part.

18. The system of claim 16, further comprising a second removing component configured to remove media from the mandrel.

19. The system of claim 16, wherein the vacuum component is configured to alternately create and release the vacuum two times.

20. The system of claim 16, wherein the vacuum component is configured to alternately create and release the vacuum at least three times.

21. The system of claim 16, wherein the vacuum component is configured to create the vacuum for five to ten seconds.

22. The system of claim 16, wherein the applying component is configured to apply isopropyl alcohol on the surface of the mandrel.

23. The system of claim 16, wherein the designated period of time is three to five minutes.

24. The system of claim 16, wherein the mandrel is a frame mandrel.

25. The system of claim 16, wherein the part is a fuselage.

26. A system for removing a mandrel from a part, comprising:
    cutting means for cutting an access passage in the part;
    vacuum means for alternately creating a vacuum in the mandrel and releasing the vacuum in the mandrel;
    applying means for applying a debonding agent on the surface of the mandrel;
    standing means for allowing the debonding agent to stand on the mandrel for a designated period of time; and
    removing means for removing the mandrel from the part.

27. A system for removing a frame mandrel from a fuselage, comprising:
    a cutting component configured to cut an access passage in the fuselage to allow for the straightest path to remove the frame mandrel from the part;
    a vacuum component configured to alternately create a vacuum in the frame mandrel for five to ten seconds and release the vacuum in the frame mandrel at least two times;
    an applying component configured to apply isopropyl alcohol on the surface of the frame mandrel;
    an allowing component configured to allow the isopropyl alcohol to stand on the frame mandrel for three to five minutes; and
    a removing component configured to remove the frame mandrel from the fuselage.

28. A system for removing a frame mandrel from a fuselage, comprising:
    cutting means for cutting an access passage in the fuselage to allow for the straightest path to remove the frame mandrel from the part;
    vacuum means for alternately creating a vacuum in the frame mandrel for five to ten seconds and releasing the vacuum in the frame mandrel at least two times;
    applying means for applying isopropyl alcohol on the surface of the frame mandrel;
    standing means for allowing the isopropyl alcohol to stand on the frame mandrel for three to five minutes; and
    removing means for removing the frame mandrel from the fuselage.

* * * * *